United States Patent [19]

Nelson et al.

[11] Patent Number: 4,863,994

[45] Date of Patent: Sep. 5, 1989

[54] USE OF MONOHYDRIC ALCOHOLS IN MOLDED POLYURETHANE RESINS

[75] Inventors: Donald L. Nelson, Middlefield; Douglas P. Waszeciak, North Haven, both of Conn.

[73] Assignee: The Dow Chemical Company, Midland, Mich.

[21] Appl. No.: 210,958

[22] Filed: Jun. 24, 1988

[51] Int. Cl.$^4$ ............................................. C08B 18/28
[52] U.S. Cl. ............................... 524/874; 252/182.25; 252/182.27; 428/425.6; 524/875; 528/49
[58] Field of Search .................. 524/874, 875; 528/49; 252/182.25, 182.27; 428/425.6

[56] References Cited

U.S. PATENT DOCUMENTS

| | | | |
|---|---|---|---|
| 3,189,578 | 6/1965 | Kuemmerer | 260/77.5 |
| 3,875,086 | 4/1975 | Ramey et al. | 260/2.5 AM |
| 4,371,476 | 2/1983 | Newkirk et al. | 260/709 |
| 4,581,386 | 4/1986 | Taylor et al. | 521/125 |
| 4,615,822 | 10/1986 | Magnus | 252/182.25 |
| 4,727,868 | 3/1988 | Szycher et al. | 128/156 |

*Primary Examiner*—Maurice J. Welsh
*Attorney, Agent, or Firm*—James S. Rose

[57] ABSTRACT

Disclosed are novel active hydrogen compositions comprising: (1) a polymeric polyol; (2) a low equivalent weight cross-linking polyol; (3) optionally a second polyol having an equivalent weight up to about 500; and (4) a sufficient amount of a monohydric alcohol of equivalent weight up to about 1,500 to provide a monophase low viscosity blend.

Also disclosed are the molded polyurethanes produced from the above compositions, and, particularly high strength mat molded reaction injection molded parts.

26 Claims, No Drawings

USE OF MONOHYDRIC ALCOHOLS IN MOLDED POLYURETHANE RESINS

FIELD OF THE INVENTION

This invention relates to molded polyurethanes and is more particularly concerned with mat-molded RIM (reaction injection molded) parts and active hydrogen compositions as precursors therefor.

DESCRIPTION OF THE PRIOR ART

The use of polyurethanes and/or polyisocyanurate resins in the preparation of molded articles used in a wide variety of applications is a well known field of technology. Further, the production of reinforced and mat-molded parts by the reaction injection molding procedure is also well known. For typical disclosures in such areas see U.S. Pat. Nos. 4,272,618; 4,296,212; 4,374,210; 4,433,067; 4,435,349; 4,530,941; and 4,546,114.

One of the difficulties in this field of technology is the fact that the so-called B side components required to react with the polyisocyanates invariably contain a number of ingredients which tend to be incompatible with each other, at least over an extended period of time. This is particularly true in the case of polymeric polyols mixed with lower molecular weight polyols such as glycols. Accordingly, there is a continual need for improved miscible blends of polymeric polyols with other active hydrogen containing compounds.

SUMMARY OF THE INVENTION

The present invention in its broadest scope is directed to active hydrogen compositions comprising a polymeric polyol having at least two hydroxyl groups, a low equivalent weight cross-liking polyol, optionally additional polyols having an equivalent weight up to about 500, and a sufficient amount of a monohydric alcohol of equivalent weight up to about 1500 to provide a monophase low viscosity blend.

A particular class of the above blends comprises:

(1) from about 4 to about 6 percent by weight of a polymeric polyol of molecular weight from about 1,500 to about 12,000 and functionality from about 2 to about 8;

(2) from about 2 to about 80 percent by weight of a cross-linking polyol of equivalent weight less than about 120 and functionality from about 3 to about 6;

(3) from zero to about 80 percent by weight of a difunctional extender of equivalent weight from about 30 to about 300; and (4) from about 1 to about 90 percent by weight of an alkyleneoxy or polyalkyleneoxy monohydric alcohol of equivalent weight from about 90 to about 1,500 wherein the total combined weights of (1), (2), (3), and (4) equals 100 percent.

The invention is also directed to molded polyurethane polymers prepared by the reaction of organic polyisocyanates with the active hydrogen compositions set forth above, optionally in the presence of a urethane and/or isocyanurate forming catalyst.

The term "cross-linking polyol" as used herein means a polyhydric chain extender having a functionality greater than two and hydroxyl equivalent weight less than about 120.

The term "monophase" means a single phase or miscible in reference to the multicomponent blends of the invention at the time of any subsequent agitation.

The term "low viscosity" means a viscosity measured at 25° C. of less than about 800 cps (preferably less than about 400 cps.

The term "molecular weight" means the number average molecular weight as determined by end-group analysis or other colligative property measurement.

The term "equivalent weight" of any reactive species means its molecular weight divided by its particular number of reactive groups.

Notably, the active hydrogen compositions in accordance with the present invention depart radically from the prior art by containing substantial weight proportions of monofunctional or monohydric alcohols. Monofunctnal reactants particularly in polyurethane formation have been considered detrimental to resulting polymer physical properties due to their chain ending activity. Generally speaking, their use is prohibited. Surprisingly, the molded polyurethanes in accordance. with the present invention produced from the novel blends, while showing some property losses, retain more than sufficient physical properties to allow their use. Moreover, molded reinforced composites in accordance with the present invention can be prepared with improved toughness in spite of the monofunctional component. This improved toughness is accomplished without having to resort to the prior art use of expensive purified difunctional isocyanate components.

One of the unexpected advantages to flow from the present invention is the miscibility of the polyol compositions, notwithstanding the presence of notoriously insoluble extenders. Just as unexpected is the discovery that the solvency and presumably cutting or wetting capacity of the monohydric components results in polyol blends having very low viscosities as defined above. This in turn leads to excellent wet-out by the resinous polyurethane forming ingredients of any fibrous reinforcing material employed during the preparation of molded composites. All of these attributes of the active hydrogen compositions facilitate the processing of the polyurethane resin forming ingredients during the molding operations. It is in the formation of high strength reaction injection molded (RIM) composites with fiberglass that the present glycol compositions excel both in regard to their processing advantages and for the physical properties of the resulting RIM parts.

The molded products are useful as structural members in automotive applications, such as doors, hoods, skirts, load floors, instrument panels, and the like; in the manufacture of appliances, furniture, building construction panels, sporting goods equipment such as shin guards, chest protectors, and the like.

DETAILED DESCRIPTION OF THE INVENTION

The active hydrogen compositions defined above are readily prepared using any conventional means known to one skilled in the art for mixing liquid components together. This includes mixing the components manually or mechanically in small scale hand-mix procedures in suitable containers such as beakers, flasks, pails, and the like, up to large scale batch or continuous mixing in stirred kettles, vats, tanks, and the like. It is preferable, particularly if the compositions are not to be used immediately, or, are being manufactured on a large scale for packaging and eventual shipment and storage, that the components are mixed under the exclusion of air and atmospheric moisture. This is most readily accomplished by mixing under a positive pressure of an inert gas such as nitrogen, argon, and the like. Heating may or may not be necessary to effect the formation of the blends. If it is found expedient to do so for whatever reason such as when a low melting solid or waxy reactive hydrogen component is employed, then the components may be heated together at the necessary temperature to effect solution.

All of the components individually are well known to those skilled in this art, including the blending together of the polyhydric components. However, it is the addition of the monohydric alcohol component wherein the novelty resides. Accordingly, it is the latter component which is employed in sufficient proportions with respect to the others which gives rise to the monophase low viscosity blends as defined above.

The polymeric polyol component can be any organic polyol provided it has at least 2 hydroxyl groups and a molecular weight of at least 650. It is to be understood that, if desired, mixtures of polymeric polyols can be employed. Preferably, the polyol has a molecular weight from about 1,500 to about 12,000 with a functionality from about 2 to about 8 and includes polyether polyols, polyester polyols, reinforced or polymer polyols, polycarbonate polyols, resole polyols, polybutadiene based polyols, and the like. More preferably, the functionality is from about 2 to about 4 with the hydroxyl functionality being predominantly primary and a molecular weight from about 2,000 to about 6,000.

Illustrative, but not limiting, of the classes of polyols which can be used are the polyoxyalkylene polyethers; polyester polyols; polyol adducts derived from ethylene oxide with methylenedianiline and polymethylene polyphenylamine mixtures (in accordance with U.S. Pat. No. 3,499,009); polyols obtained by the Mannich condensation of a phenolic compound with formaldehyde, an alkanolamine, and ethylene oxide (in accordance with U. S. Pat. No. 3,297,597); vinyl reinforced polyether polyols, e.g. by the polymerization of styrene or acrylonitrile in the presence of the polyether; polyacetals prepared from glycols such as diethylene glycol and formaldehyde; polycarbonates, for example those derived from butanediol with diarylcarbonates; polyester amides; the resole polyols (see Prep. Methods of Polymer Chem. by W. R. Sorenson et al., 1961, page 293, Interscience Publishers, New York, N.Y.); and the polybutadiene resins having primary hydroxyl groups (see Poly Bd. Liquid Resins, Product Bulletin BD-3, October 1974, Arco Chemical Company, Div. of Atlantic Richfield, New York, N.Y.).

A preferred group of polyols comprises the polyalkyleneoxy polyols particularly the propyleneoxy-polyethyleneoxy capped diols, triols, and tetrols obtained by the alkoxylation of water, ammonia, ethylene glycol, propylene glycol, trimethylolpropane, aniline, ethanolamine, ethylene diamine, and the like; the polyester diols obtained from the reaction of dibasic carboxylic acids such as succinic, adipic, suberic, azelaic, phthalic, isophthalic, and the like with alkylene glycols and oxyalkylene glycols to form the corresponding polyalkylene, and polyoxyalkylene ester diols or copolymers thereof; polyester polyols derived from crude reaction residues and scrap polyester resin sources by their transesterfication with low molecular weight glycols; and the vinyl-resin reinforced propyleneoxy-ethyleneoxy capped diols and triols, particularly those polyethers reinforced with polyacrylonitrile.

Any cross-linking polyol or mixtures of such polyols meeting the definition set forth above can be employed. It will be readily apparent to one skilled in the art that such polyols must have functionalities greater than 2 and low equivalent weights so as not to dissipate the polyfunctionality simply in branching. It is preferable that its functionality fall within the range of from about 3 to about 6. More preferably the functionality is from about 3 to about 4 with a hydroxyl equivalent weight from about 50 to about 100. Illustrative but non-limiting thereof are ethylene oxide and/or propylene oxide and/or butylene oxide derivatives of such initiators as glycerine, trimethylolpropane, trimethylolethane, pentaerythritol, ethanolamine, diethanolamine, triethanolamine, ethylene diamine, propylene diamine, butylene diamine, diethylenetriamine, triethylenetetramine, inositol and derivatives thereof with ethylene and/or propylene oxide, and the like. The illustrative alkyleneoxy derivatives of the alkylene polyamines set forth above are found to be particularly advantageous in the compositions in accordance with the present invention.

The optional component has been defined above as additional polyols of equivalent weight up to about 500. While such a definition will include low molecular weight polyols overlapping with those polymeric polyols discussed above at the lower end of their range, a preferred group of optional components comprises the well known difunctional extenders having an equivalent weight range of from about 30 to about 300, and, preferably from about 30 to about 200.

Illustrative of such extenders are aliphatic straight and branched chain diols having from about 2 to 10 carbon atoms, inclusive, in the chain. Illustrative of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 1,9-nonanediol, 2-methyloctane-1,8-diol, 1,4-cyclohexanedimethanol, hydroquinone bis(hydroxyethyl)ether, and the like including mixtures of two or more such diols. The extenders, which can be used alone or in admixture with each other or any of the above diols, also include diethylene glycol, dipropylene glycol, tripropylene glycol, and the like, as well as ester diols obtained by esterifying adipic, azelaic, glutaric and like aliphatic dicarboxylic acids with aliphatic diols such as those exemplified above utilizing from about 0.01 to about 0.8 mole of acid per mole of diol. Also included in the extenders which can be used in preparing the polyurethanes of the invention are the adducts obtained by reacting an aliphatic diol such as 1,4-cyclohexanedimethanol, neopentyl glycol, hexane-1,2-diol, ethylene glycol, butane-1,4-diol, and the like with ε-caprolactone in a mole ratio of from 0.01 to 2 moles of caprolactone per mole of diol or triol. Trifunctional extenders such as glycerol, trimethylolpropane and the like can also be employed in a minor proportion (less than 20 equivalent percent) with one or more of the above diols.

While any of the diol extenders described and exemplified above can be employed alone, or in admixture, it is preferred to use 1,4-butanediol, 1,6-hexanediol, neopentyl glycol, 1,4-cyclohexanedimethanol, ethylene glycol, diethylene glycol, propylene glycol and dipropylene glycol, either alone or in admixture with each other or with one or more aliphatic diols previously named.

The monohydric alcohol component as defined above has an equivalent weight of up to about 1,500. Since it is monofunctional, this means the equivalent weight is synonymous with molecular weight. Although not wishing the present invention to be limited by any theoretical considerations but only by the claims appended hereinbelow, it is believed that this component acts in the capacity of a wetting agent or surfactant. In this role it solubilizes the various components in the blend. Any monohydric alcohol or mixture of such alcohols falling within this definition may be employed in the present blends, although generally speaking their efficacy in solubilizing all the blend components and to lower blend viscosity will increase with increasing linear molecular conformation. Put in simpler terms, the longer the molecular distance between the hydroxyl function and the end of the molecule, the more efficient is the component in achieving its unexpected results in the compositions. However, there is a reasonable upper limit on this length which is best defined by the upper equivalent weight limit. In this same connection, it is preferred that it have a minimum equivalent weight of about 90. Advantageously, the equivalent weight will fall within a range of from about 90 to about 1,500, preferably, from about 200 to about 1,000 and, most preferably, from about 400 to about 600.

Illustrative but non-limiting of the monohydric alcohols are the $C_6$ to $C_{20}$ aliphatic alcohols such as hexanol, heptanol, octanol, decanol, undecanol, dodecanol, tridecanol, tetradecanol, pentadecanol, hexadecanol, heptadecanol, octadecanol, nonadecanol, eicosanol, and the like; although higher aliphatic alcohols may be used, the above range of alcohols are readily available commercially; the cellosolves and carbitols such as butyl cellosolve (monobutyl ether of ethylene glycol), carbitol (monoethyl ether of diethylene glycol), methyl carbitol (monomethyl ether of diethylene glycol), butyl carbitol (monobutyl ether of diethylene glycol), and the like; the ethylene oxide and/or propylene oxide and/or butylene oxide adducts of the well known alkylphenols such as butylphenol, pentylphenol, heptylphenol, octylphenol, nonylphenol, decylphenol, and the like; the polyalkyleneoxy adducts of lower aliphatic, cycloaliphatic, or aryl alcohols having the generic formula $B(OCH_2CHR)_xOH$ wherein B represents $C_1$ to $C_8$ alkyl such as methyl, ethyl, propyl, butyl, pentyl, hexyl, heptyl, octyl, and isomeric forms thereof; or $C_6$ to $C_{18}$ aryl such as phenyl, tolyl, naphthyl, and the like, or $C_5$ to $C_7$ cycloalkyl such as cyclopentyl, cyclohexyl, cycloheptyl; R represents hydrogen, methyl, or ethyl, or mixtures thereof in the same molecule, and x can have an average value from about 1 to about 30; the preferred limitations on this class of polyalkyleneoxy adducts are those wherein B is lower alkyl $C_1$ to $C_4$, R is hydrogen and/or methyl, and x has an average value from about 4 to about 15.

Of the various classes set forth above those falling within the alkyleneoxy or polyalkyleneoxy class are preferred because they offer the best overall properties both in regard to their efficacy in the compositions of the invention and because they are liquids at room temperature (circa 20° C.) as opposed to the long chain aliphatic alcohols, for example which are waxes or solids at room temperature therefore requiring the heating of the compositions during mixing. More preferred are the polyalkyleneoxy adducts of the lower aliphatic alcohols having a molecular weight of from about 200 to about 1,000, particularly those meeting the generic formula set forth above. Most preferred are those polyalkyleneoxy compounds which are polyethyleneoxy-capped polypropyleneoxy monohydric alcohols.

In respect of the proportions in which the various blend components can be employed together, it should be noted that a wide variation can be tolerated. Regardless of the proportions of the (1) polymeric polyol, (2) cross-linking polyol, and (3) optional polyol, sufficient proportions of (4) the monohydric alcohol must be present to compatibilize the other components together particularly the (2) and (3) components with the polymeric polyol at the time of any subsequent agitation. At the same time this minimum proportion of (4) should result in a lowering of the blend viscosity to the levels set forth above. It should be recognized that such blends of active hydrogen containing compositions can find a broad range of utilities which will dictate the desired proportions of each specific ingredient whether in polyurethane adhesive formulations, epoxy formulations, and the like. Such desired proportions are easily determined by simple trial and error experiments for each specific application. However, in respect of their utility in polyurethane formation, particularly molded polyurethane applications, there are optimum component proportions which are found to be most efficacious. In this connection, the expressed preferences set forth above for the individual components are made with a particular view to the preparation of molded polyurethane polymers. To this end, a particular class of active hydrogen compositions setting forth the identity and proportions of each of the components is described above. A preferred composition is as follows: (1) from about 7 to about 50 percent by weight of a polyalkyleneoxy polyol of molecular weight from about 2,000 to about 6,000 and functionality from about 2 to about 4, (2) from about 7 to about 70 percent by weight of a cross-linking polyol of equivalent weight from about 50 to about 100 and functionality from about 3 to about 4, (3) from zero to about 60 percent by weight of a difunctional extender of equivalent weight from about 30 to about 200, and (4) from about 4 to about 80 percent by weight of a polyalkyleneoxy monohydric alcohol of equivalent weight from about 200 to about 1,000 based on the combined component weights of 100 percent. An even more preferred range of proportions are from about 15 to about 35 percent of (1); from about 15 to about 50 percent of (2); from about 5 to about 30 percent of (3); and from about 10 to about 60 percent of (4).

The molded polyurethane polymers in accordance with the present invention can be prepard during any of the manual or machine mixing techniques known to this art. The molding operation can also be any of the known molding operations such as open or closed molds, casting the reactants into open molds which are then closed with vice clamps, pneumatically, or mechanically operated molds automatically opened and closed on a continuous turntable operation, and the like. A particularly facile method is the RIM procedure operated either in a static or continuous mode using the procedures for automatically opening/closing the molds, etc. Particular reference to RIM techniques can be found in U.S. Pat. Nos. 4,272,618; 4,296,212; 4,374,210; 4,433,067; 4,435,349; and 4,546,114 which patent disclosures relative thereto are incorporated herein by reference.

Any of the organic polyisocyanates employed in the art for the preparation of molded polyurethanes can be used herein. Included are those organic polyisocyanates disclosed in the incorporated references such as organic di- or higher functionality aliphatic or aromatic polyisocyanates. The preferred class comprises the aromatic polyisocyanates.

Illustrative, but not limiting thereof, are 1,6-hexamethylene diisocyanate, 1,4-cyclohexylene diisocyanate, 4,4'-methylenebis(cyclohexyl isocyanate), m- and p-phenylene diisocyanate, 2,4- and 2,6-toluene diisocyanate and mixtures of these two isomers, methylenebis(phenyl isocyanate) inclusive of 4,4'-methylenebis(phenyl isocyanate), 2,4'-methylenebis(phenyl isocyanate), and mixtures of these methylenebis(phenyl isocyanate) isomers, 3,3'-dimethyl-4,4'-diisocyanatodiphenyl methane; liquefied forms of methylenebis(phenyl isocyanate) particularly liquefied forms (including mixtures containing up to about 50 percent of the 2,4'-isomer) of 4,4'-methylenebis(phenyl isocyanate) such as the carbodiimide-containing 4,4'-methylenebis(phenyl isocyanates) having isocyanate equivalent weights of from about 130 to about 180 prepared for example by heating 4,4'-methylenebis(phenyl isocyanate) with a carbodiimide catalyst to convert a portion of said isocyanate to carbodiimide; and liquefied forms of 4,4'-methylenebis(phenyl isocyanate) which have been reacted with minor amounts (from about 0.04 to about 0.2 equivalent per equivalent of isocyanate) of low molecular weight glycols such as dipropylene glycol, tripropylene glycol, and mixtures thereof; isocyanate terminated prepolymers having an isocyanate content of about 9 to about 20 percent by weight prepared from methylenebis(phenyl isocyanate) and a polyol having a functionality from 2 to 3 selected from polyalkyleneoxy polyols of molecular weight 1000 to 10,000 polytetramethylene glycols of molecular weight 600 to 5000, and polyester polyols of molecular weight 500 to 8000, said polyol and said methylenebis(phenyl isocyanate) being reacted in the proportions of about 0.01 equivalent to about 0.5 equivalent of said polyol per isocyanate equivalent; blends or mixtures of the liquefied methylenebis(phenyl isocyanates) with each other and with the isocyanate terminated prepolymers described above in any proportions desired; polymethylene poly(phenyl isocyanate) mixtures containing from about 20 percent to about 85 percent by weight (preferably about 30 to about 60 percent) of methylenebis(phenyl isocyanate), with the balance of 80 to 15 percent by weight (70 to 40 percent) of the mixtures being polymethylene poly(phenyl isocyanates) of functionality higher than 2; included in the polymethylene poly(phenyl isocyanates) are those having the 4,4'-methylenebis(phenyl isocyanate) isomer and mixtures including up to about 30 percent of the corresponding 2,4'-isomer. One of the inherent advantages in the present polymers is the fact that they can be obtained with excellent physical properties while using the commercially attractive so-called crude polyisocyanate mixtures. To this extent, particularly preferred are the polymethylene poly(phenyl isocyanate) mixtures described above.

In its broadest scope the present invention comprehends the reaction of any one of the isocyanates described above or mixtures thereof with the active hydrogen compositions described in detail above. During the preparation of the polymers the components (1), (2), (3), and (4) need not be added as the premixed blend but can be added in any sequence or combination desired. In another embodiment, one or more of the components, particularly the polymeric polyol or optional polyol can be prereacted with polyisocyanate to form a soft or hard segment quasi-prepolymer or prepolymer which is then reacted with (2) and (4). In the most preferred and convenient embodiment, the ingredients are added as the premixed compositions described above in a one-spot process.

Accordingly, all of the subject matter and discussion set forth above in respect of the active hydrogen compositions along with the proportions including the preferred and more preferred limitations, apply with equal force in the preparation of the molded polyurethanes.

In its broadest scope the molded polyurethanes can be prepared optionally in the presence of a urethane and/or isocyanurate forming catalyst. The presence of the latter is dictated by the isocyanate to active hydrogen equivalents ratio. That is to say, if it is desired to have polyisocyanurate linkages along with the polyurethane in the resulting polymer, then a ratio exceeding about 1.15:1 is called for in conjunction with an isocyanurate forming catalyst. If mainly polyurethane linkages are desired and the active hydrogen containing components, particularly the cross-linker (2) contains a nitrogen atom which is autocatalytic in terms of urethane formation, then a urethane catalyst may not be necessary. Accordingly, the proportions of reactants are chosen such that the ratio of isocyanate equivalents to the total active hydrogen equivalents from (1), (2), (3), and (4) falls within a range of from about 0.85:1 to about 4:1 provided that when said ratio exceeds about 1.15:1 an isocyanurate catalyst is employed. Preferably, a urethane catalyst is employed with an isocyanate to total active hydrogen equivalent ratio falling within a range of from about 0.90:1 to about 1.15:1, and, most preferably 0.95:1 to 1.10:1.

Any of the urethane catalysts known in the art can be employed in catalytic amounts in the present process. Such catalysts include organic and inorganic acid salts of, and organometallic derivatives of bismuth, tin, lead, antimony, cobalt, and the like, as well as phosphines and tertiary organic amines. A preferred group of such catalysts include stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isooctylthioglycolate), and the like; triethylamine, triethylenediamine, N,N,N',N'-tetramethylethylenediamine, N-methylmorpholine, N,N-dimethylcyclohexylamine, and the like, and mixtures of the above in any combination.

The trimerization catalyst if employed can be any catalyst known to those skilled in the art which will catalyze the trimerization of an organic isocyanate compound to form the isocyanurate moiety. For typical isocyanate trimerization catalysts see The Journal of Cellular Plastics, November/December 1975, page 329; and the patents cited supra which disclosures are already herein incorporated.

Typical catalyst classes are the glycine salts and tertiary amine trimerization catalysts and alkali metal carboxylic acid salts disclosed in the above patents and mixtures of the various types of catalysts. Some preferred species within the classes are sodium N-(2-hydroxy-5-nonylphenyl)methyl-N-methylglycinate, and N,N-dimethylcyclohexylamine, and mixtures thereof. Also included in the preferred catalyst components are the epoxides disclosed in U.S. Pat. No. 3,745,133.

The total quantity of catalyst if used, including mixtures thereof, can fall within a range of from about 0.001 percent by weight to about 5 percent based on total polyurethane or polyisocyanurate forming ingredients weight.

In an optional embodiment the polyurethane resin employed can be filled or reinforced in order to provide so-called RRIM articles. The fillers can be any of the conventional materials used in the art. Typically, these include flaked or milled glass, glass fibers in lengths of from about 1/16 inch to ¼ inch, glass strands, and the like, alumina, titanium dioxide, calcium carbonate, talc, carbon black, powdered gypsum, natural clays such as kaolin, china clay, chopped rubber scrap, natural silica, and the like.

The fillers can be used in proportions of from about 1 to about 50 percent by weight based on the polyurethane resin forming ingredients, and, preferably, from about 5 to about 30 percent by weight.

Other optional additives can be employed in the resin forming ingredients. Typical of such additional components are wax lubricants, antioxidants, internal mold release agents, flame retardants, colorants, and the like. Typical but non-limiting flame retardant additives are the phosphorus containing flame retardants including those having active hydrogen reactivity (hydroxyl and amine groups) such as dibromoeopentyl glycol, tris(2-chloroethyl)phosphate, tris(2-chloropropyl)phosphate, tris(2,3-dibromopropyl)phosphate, tri(1,3-dichloroisopropyl)phosphate, and the like.

It is in the preparation of high strength molded composites wherein the present active hydrogen compositions and the resulting polyurethanes excel. The term "high strength" means having a flex modulus of at least 200,000 psi and preferably from about 200,000 to 5,000,000 psi. The term "composite" as it refers to the products made in accordance with the present invention has the significance generally accepted in the molding art to include the use of fibrous matted material embedded into, or impregnated by, the resin component which in the present case is preferably a polyurethane resin. The term does not include loose fibrous material. The term includes in its scope mat molded RIM (or MMRIM) articles. Additionally, included in the present process are the use of the fillers set forth above.

The term "fibrous material" does mean a fibrous material in the form of a mat. The fibrous components can be held within the mat form by mechanical forces but more often by the use of a polymeric adhesive such as a polyvinyl acetate, polyester, polyepoxide, and the like, or else by being woven or stitched. The fibrous arrangement in the mat can be random or oriented, and the like. Illustratively the fibrous material can be glass fiber, or an organic fiber inclusive of graphite fiber, polyester fiber, polyamide fiber, polyaramid fiber, and the like. The above fibrous materials are meant to be extremely only with the present process not limited solely to these examples. Any fibrous mat material can be employed in the present method. Although glass fibrous material is most preferred in the weight proportions set forth below.

At least one mat is employed in the process of the invention and preferably a plurality thereof with the only limitation in numbers being imposed by practical considerations and by the thickness of the molded part being prepared and the thickness of the mats involved. It is also advantageous to employ combinations of at least one organic fiber mat along with the at least one fiberglass mat.

The mats are placed in the mold either manually or by a mechanical delivery system prior to placing the mold cover in position.

The weight percent contributed to the composite will vary considerably depending on the type of fibrous material employed. Advantageously, it will fall within the range of from about 10 to about 70 weight percent, preferably from about 10 to about 60 weight percent.

Although it is not an essential requirement in the process of the present invention, it is preferred that the molds be at a temperature above ambient room temperatures when they receive the resin forming ingredients. Advantageously, the mold temperatures fall within the range of from about 120° F. to about 220° F. It will be readily understood that mold temperatures will vary depending on whether polyurethane or polyurethane-polyisocyanurate is being prepared; for the former, mold temperatures of about 120° F. to about 170° F. are advantageous while a range of from about 160° F. to about 220° F. is more useful for the latter.

The RIM molded composites in accordance with the invention in spite of a high weight percentage content of monofunctional ingredients have perfectly adequate physical properties to allow their utility in the end-use applications set forth above. In fact, in some instances the improvement observed in modulus, impact strengths, and toughness more than make up for whatever losses may be noted in other less important properties. This increased toughness also aids in part demolding as the flash tends to stay with the part instead of adhering to the mold. Also, as noted above, the facility with which the fiberglass mats can be wetted out to result in low void contents and very smooth surfaces of the molded parts attests to the value of the active hydrogen compositions of the invention because of the addition of the monohydric component.

The following examples describe the manner and process of making and using the invention and set forth the best mode contemplated by the inventors of carrying out the invention but are not to be construed as limiting.

EXAMPLE 1

This experiment describes the preparation of three active hydrogen compositions and their employment in preparing molded polyurethanes (runs 1 to 3) all in accordance with the present invention and the preparation of a comparison blend and molded polyurethane not so in accordance.

The components of the four blends are mixed together in the properties of parts by weight set forth in Table I. As noted below, the viscosities of the initially mixed blends are measured before any other ingredients are added and the same blends visually observed after standing for 24 hours for any evidence of separation. The comparison blend with no monohydric alcohol settles into two layers or two phases in less than 24 hours and its viscosity prior to separation is measured as 998 cps (25° C.). Significantly, the blends 1 to 3 do not phase separate and their viscosities are dramatically lower as compared with the comparison blend. The cutting and solvency power of the monohydric alcohol component gives rise to the unexpected stability and lowered viscosities of the blends 1 to 3.

In the preparation of the molded polyurethanes, the A tank of a Krauss-Maffei Model PU-40 RIM machine is charged with the polyisocyanate component at about 85° F. component temperature. The B tank is charged with the active hydrogen composition ingredients in the proportions set forth in Table I along with a polyurethane catalyst. The catalyst level for runs 1 to 3 represents about 0.1 weight percent based on total polyol component. A lower catalyst percentage of 0.05 weight percent for the comparison run reflects the higher tertiary amine content in this control. The B temperature is adjusted to about 115° F. Metering pumps from each tank are used to deliver the A and B components in the proportions set forth in Table I at 1,000 psi into the impingement mixing head of the RIM machine. The isocyanate to active hydrogen ratio for all runs is 1.05. After mixing, the reaction mixture is directed into a center gated metal mold measuring 36 inches × 16 inches × 3/16 inch at 140° F.

While the presence of the monohydric alcohol tends to diminish modulus properties of unfilled resin system, particularly at higher levels, its negative effect is minimal and within quite acceptable levels. In fact, run 1 at a lower level of monohydric alcohol is characterized by some measurably superior physical properties over the comparison molding. Improved processability due to lower blend B viscosity and the stability of the latter offsets the drop-off in physical properties of resulting molded products.

TABLE I

| Runs | Comparison | 1 | 2 | 3 |
|---|---|---|---|---|
| Ingredients (pts. by wt.): | | | | |
| Component A | | | | |
| Polyisocyanate[1] | 184 | 192 | 201 | 218 |
| Component B | | | | |
| Polyol[2] | 45 | 45 | 45 | 45 |
| Cross-linking polyol[3] | 50 | 50 | 50 | 50 |
| Diethylene glycol | 30 | 30 | 30 | 30 |
| Monohydric alcohol[4] | — | 30 | 60 | 120 |
| Urethane catalyst[5] | 0.06 | 0.15 | 0.18 | .24 |
| Blend B Properties[6] | | | | |
| Number of phases | 2 | 1 | 1 | 1 |
| Viscosity cps 25° C. | 998 | 298 | 284 | 200 |
| 50° C. | 214 | 81 | 81 | 59 |
| Properties | | | | |
| Specific gravity | 1.19 | 1.19 | 1.20 | 1.18 |
| Flex strength (psi) | 10,000 | 10,600 | 8,000 | 4,500 |
| Flex modulus (psi) | 255,000 | 266,000 | 199,000 | 96,300 |
| Tensile strength (psi) | 7,220 | 6,780 | 5,360 | 3,050 |
| Tensile modulus (psi) | 209,000 | 178,000 | 174,800 | 88,300 |
| % Elongation | 14 | 18.9 | 22 | 28 |
| HDT @ 264 psi (°C.)[7] | 90 | 68 | 51 | 44 |
| Notched Izod[8] (ft.-lbs./in.) | 1.4 | 1.0 | 1.0 | 0.8 |

Footnotes to Table I
[1]Polyisocyanate: a polymethylene poly(phenyl isocyanate) mixture comprising a methylenebis(phenyl isocyanate) content of about 45 percent by weight and the remainder comprising polymethylene poly(phenyl isocyanate) of functionality greater than 2; I.E. = about 134.
[2]Polyol: A polyethyleneoxy-polypropyleneoxy triol; molecular weight = about 5,000.
[3]Cross-linker: A mixed ethylene/propyleneoxide adduct of ethylene diamine; eq. wt. = about 70; functionality = about 4.
[4]Monohydric alcohol: A butyl alcohol initiated polyethyleneoxy-polypropyleneoxy monohydric alcohol; eq. wt. = about 500.
[5]Urethane catalyst: A dibutyltin dialcoholate polyurethane catalyst supplied by Witco Chemical Corporation under the trade name UL-38.
[6]Blend B properties: The blends of polyol, cross-linking polyol, diethylene glycol and monohydric alcohol in the case of runs 1 to 3 are initially mixed and their viscosities measured at both 25° C. and 50° C.; after 24 hours the blends are observed visually for phase separation; no other ingredients are added to the test blends.
[7]HDT: Heat deflection temperature determined in accordance with ASTM Test Method D648.
[8]Notched Izod: Impact strength measured in accordance with ASTM Test Method D256-56.

EXAMPLE 2

This experiment describes the preparation of a series of molded high strength composites consisting of fiberglass mats impregnated with reaction injection molded polyurethane polymer.

The same procedure and formulations set forth above in Example 1 and Table I under the headings comparison and 1 to 3 are employed in this series except that fiberglass mats are additionally employed. The appropriate number of 2 oz./sq. ft. fiberglass mats are cut to size just to fill the mold and laid flat one on top of the other prior to closing the mold and shooting the RIM mixture therein.

In a first series, two of the fiberglass mats are used in each one of the moldings. In runs 1(a) to 3(a) in accordance with the present invention, the polyurethane formulations corresponding to runs 1 to 3 described above are used. The comparison (a) run corresponding to the polyurethane formulation used in the comparison run (Table I) without monohydric alcohol is used with two of the mats. Similarly, in a second series except for the use of four of the glass mats instead of two, there are prepared runs 1(b) to 3(b) and their comparison (b) with no monohydric alcohol. The physical properties for these molded parts are set forth in Table II below.

The blends of the invention because of their superior processability and low viscosity result in improved glass wet out as evidenced by lack of voids and excellent surface smoothness in the molded parts of runs 1(a) to 3(a) and 1(b) to 3(b). The comparison (a) and (b) parts contain voids and lack the same surface smoothness.

In examining the measured physical properties set forth in Table II there is no large decrease in properties at either the 25 nor 45 weight percent glass content over the comparison (a) and (b). In fact, overall toughness and modulus properties can be improved over the control while employing the monofunctional alcohol component.

TABLE II

| Runs | Comparison (a) | 1(a) | 2(a) | 3(a) | Comparison (b) | 1(b) | 2(b) | 3(b) |
|---|---|---|---|---|---|---|---|---|
| Number of mats[1] | 2 | 2 | 2 | 2 | 4 | 4 | 4 | 4 |
| Glass content (wt. %) | 25 | 25 | 25 | 25 | 45 | 45 | 45 | 45 |
| Properties | | | | | | | | |
| Specific gravity | 1.44 | 1.39 | 1.37 | 1.40 | 1.59 | 1.52 | 1.53 | 1.59 |

TABLE II-continued

| Runs | Comparison (a) | 1(a) | 2(a) | 3(a) | Comparison (b) | 1(b) | 2(b) | 3(b) |
|---|---|---|---|---|---|---|---|---|
| Flex strength (psi) | 26,700 | 26,000 | 20,500 | 19,600 | 37,700 | 37,900 | 37,500 | 28,700 |
| Flex modulus (psi) | 774,000 | 838,000 | 586,000 | 595,000 | 1,153,000 | 1,220,000 | 1,238,000 | 1,029,000 |
| Tensile strength (psi) | 20,300 | 17,000 | 15,700 | 15,400 | 27,200 | 29,000 | 30,200 | 28,500 |
| Tensile modulus (psi) | 875,800 | 829,000 | 727,000 | 688,000 | 1,182,000 | 1,317,000 | 1,379,000 | 1,233,000 |
| % Elongation | 3 | 3 | 3 | 3 | 3 | 3 | 3 | 3 |
| HDT @ 264 psi (°C.) | 193.6 | 195 | 175 | 183 | 208 | 206 | 205 | 196 |
| Notched Izod (ft-lbs./in.) | 9 | 8 | 9 | 11 | 15 | 15 | 15 | 20 |

Footnote to Table II
[1]Mats are 2 oz./sq. ft. continuous strand fiberglass mats bonded together by a polyester resin and supplied under the designation M-8610 by Owens Corning Fiberglass.

EXAMPLE 3

This experiment describes the preparation of two RRIM samples 1(c) and 1(f) and four composites 1(d), 1(e), 1(g), and 1(h) all in accordance with the present invention.

The same procedure and formulation set forth above in Example 1, run 1 is employed for 1(c) and 1(f) except for the inclusions in the respective formulations of alumina trihydrate and calcium carbonate fillers in the proportions of parts by weight set forth in Table III below. Similarly, the same procedure and formulation set forth above in Example 2 under the 1(a) and 1(b) samples dealing with glass mats is employed in the 1(d, e, g, and h) runs except for the inclusions of fillers and the variations in the number of glass mats as noted in Table III. The glass mats are the same 2 oz./sq. ft. fiberglass mats described in Example 2. It will be noted that a common formulation is used in all these 1(c to h) samples which is based on the run 1 set forth in Table I of Example 1. Accordingly, it is the series of properties for this run 1 which can be directly compared with the properties set forth in Table III.

In the case of the filled samples 1(c) and 1(f), the alumina trihydrate results in overall property improvements over the run 1 above with the exception of elongation. Calcium carbonate in this particular formulation does not provide the same improvements as alumina trihydrate but still provides adequate properties as set forth in 1(f) in Table III. The composite samples 1(d), 1(e), 1(g), and 1(h) show the dramatic increase in modules, impact strengths, toughness, and heat resistance properties (HDT data) when compared with the properties of run 1 of Table I above.

TABLE III

| Runs | 1(c) | 1(d) | 1(e) | 1(f) | 1(g) | 1(h) |
|---|---|---|---|---|---|---|
| Number of mats | — | 1 | 1 | — | 1 | 2 |
| Glass content (wt. %) | — | 15 | 15 | — | 15 | 25 |
| Alumina trihydrate pts. by wt. | 30 | 15 | 30 | — | — | — |
| Calcium carbonate pts. by wt. | — | — | — | 15 | 15 | 15 |
| Properties | | | | | | |
| Specific gravity | 1.35 | 1.30 | 1.44 | 1.21 | 1.24 | 1.32 |
| Flex strength (psi) | 10,400 | 16,600 | 18,500 | 7,290 | 14,200 | 21,800 |
| Flex modulus (psi) | 393,000 | 507,000 | 684,000 | 196,000 | 414,000 | 663,000 |
| Tensile strength (psi) | 7,860 | 10,000 | 10,100 | 4,660 | 8,990 | 14,600 |
| Tensile modulus (psi) | 416,000 | 556,000 | 796,000 | 184,000 | 470,000 | 797,000 |
| % Elongation | 2.9 | 2.4 | 1.3 | 5.8 | 2.5 | 2.4 |
| HDT @ 264 psi (°C.) | 69 | 107 | 96 | 56 | 88 | 168 |
| Notched Izod (ft.-lbs./in.) | 0.5 | 5.5 | 5.2 | 0.5 | 4.6 | 7.7 |

What is claimed is:

1. An active hydrogen composition comprising (1) from about 4 to about 60 percent by weight of a polymeric polyol having at least two hydroxyl groups, (2) from about 2 to about 80 percent by weight of a low equivalent weight cross-linking polyol having a functionality greater than two, (3) from zero to about 80 percent by weight of additional polyols having an equivalent weight up to about 500, and (4) from about 1 to about 90 percent by weight of a monohydric alcohol of equivalent weight up to about 1,500 to provide a monophase low viscosity blend.

2. A composition according to claim 1 wherein said components comprise: (1) from about 4 to about 60 percent by weight of a polymeric polyol of molecular weight from about 1,500 to about 12,000 and functionality from about 2 to about 8; (2) from about 2 to about 80 percent by weight of a cross-linking polyol of equivalent weight less than about 120 and functionality from about 3 to about 6; (3) from zero to about 80 percent by weight of a difunctional extender of equivalent weight from about 30 to about 300; and (4) from about 1 to about 90 percent by weight of an alkyleneoxy or polyalkyleneoxy monohydric alcohol of equivalent weight from about 90 to about 1,500.

3. A composition according to claim 2 comprising (1) from about 7 to about 50 percent by weight of a polyalkyleneoxy polyol of molecular weight from about 2,000 to about 6,000 and functionality from about 2 to about 4;

(2) from about 7 to about 70 percent by weight of a cross-linking polyol of equivalent weight from about 50 to about 100 and functionality from about 3 to about 4;

(3) from zero to about 60 percent by weight of a difunctional extender of equivalent weight from about 30 to about 200; and (4) from about 4 to about 80 percent by weight of a polyalkyleneoxy monohydric alcohol of equivalent weight from about 200 to about 1,000.

4. A composition according to claim 3 wherein said (1) comprises a polyethyleneoxy-polypropyleneoxy triol of molecular weight about 5,000.

5. A composition according to claim 4 wherein said (2) comprises an ethylene and/or propylene oxide derivative of ethylene diamine.

6. A composition according to claim 5 wherein said (3) comprises diethylene glycol.

7. A composition according to claim 6 wherein said (4) comprises a butyl alcohol initiated polyethyleneoxy-polypropyleneoxy monohydric alcohol of equivalent weight about 500.

8. A molded polyurethane polymer having a flex modulus of at least 200,000 psi prepared by the reaction of an organic polyisocyanate, an active hydrogen composition according to claim 1 and, optionally, a urethane and/or isocyanurate forming catalyst.

9. A molded polymer according to claim 8 wherein said polyisocyanate comprises polymethylene poly(phenyl isocyanate).

10. A molded polymer according to claim 8 wherein said polymeric polyol has a molecular weight from about 1,500 to about 12,000 and functionality of about 2 to about 8.

11. A molded polymer according to claim 8 wherein said cross-linking polyol has an equivalent weight of less than about 120 and functionality from about 3 to about 6.

12. A molded polymer according to claim 8 wherein said optional polyol comprises an extender of equivalent weight from about 30 to about 300 and functionality of about two.

13. A molded polymer according to claim 8 wherein said monohydric alcohol comprises an alkyleneoxy or polyalkyleneoxy monohydric alcohol of equivalent weight from about 90 to about 1,500.

14. A molded polymer according to claim 8 wherein the proportions of reactants are such that the ratio of isocyanate equivalents to the total active hydrogen equivalents fall within a range from about 0.85:1 to about 4:1 provided that when said ratio exceeds about 1.15:1 an isocyanurate catalyst is employed.

15. A molded polymer according to claim 8 additionally comprising a fibrous reinforcing material.

16. A molded polymer according to claim 15 wherein said reinforcing material comprises at least one fiberglass mat.

17. A molded polymer according to claim 16 comprising a plurality of fiberglass mats.

18. A molded polymer according to claim 16 wherein the fiberglass content is about 10 to about 70 percent by weight of said molded polymer.

19. A molded polymer according to claim 8 additionally comprising a filler.

20. A high strength molded composite having a flex modulus of at least 200,000 psi comprising at least one fiberglass mat impregnated with a reaction injection molded polyurethane polymer prepared by the reaction of:

(A) a polymethylene poly(phenyl isocyanate);

(B) an active hydrogen composition comprising:

(1) from about 4 to 60 percent by weight of a polymeric polyol of molecular weight from about 1,500 to about 12,000 and functionality from about 2 to about 8;

(2) from about 2 to about 80 percent by weight of a cross-linking polyol of equivalent weight less than about 120 and functionality from about 3 to about 6;

(3) from zero to about 80 percent by weight of a difunctional extender of equivalent weight from about 30 to about 300; and (4) from about 1 to about 90 percent by weight of an alkyleneoxy or polyalkyleneoxy monohydric alcohol having an equivalent weight from about 90 to about 1,500; wherein the total combined weights of (1), (2), (3), and (4) equals 100 percent and (C) a urethane catalyst, wherein the proportions of reactants are such that the ratio of isocyanate equivalents to total active hydrogen equivalents from (B) falls within a range of from about 0.90:1 to about 1.15:1.

21. A molded composite according to claim 20 wherein said active hydrogen composition (B) comprises (1) from about 7 to about 50 percent by weight of a polyalkyleneoxy polyol of molecular weight from about 2,000 to about 6,000 and functionality from about 2 to about 4;

(2) from about 7 to about 70 percent by weight of a cross-linking polyol of equivalent weight from about 50 to about 100 and functionality from about 3 to about 4;

(3) from zero to about 60 percent by weight of a difunctional extender of equivalent weight from about 30 to about 200; and (4) from about 80 percent by weight of a polyalkyleneoxy monohydric alcohol of equivalent weight from about 200 to about 1,000.

22. A molded composite according to claim 21 wherein said fiberglass content is from about 10 to about 60 percent by weight of said composite.

23. A molded composite according to claim 22 wherein said (B1) is a polyethyleneoxy-polypropyleneoxy triol of molecular weight about 5,000.

24. A molded composite according to claim 23 wherein said (B2) is an ethylene and/or propylene oxide derivative of ethylene diamine.

25. A molded composite according to claim 24 wherein (B3) is diethylene glycol.

26. A molded composite according to claim 25 wherein (B4) is butyl alcohol initiated polyethyleneoxy-polypropyleneoxy monohydric alcohol of equivalent weight of about 500.

* * * * *